United States Patent [19]

Brown et al.

[11] Patent Number: 5,069,779
[45] Date of Patent: Dec. 3, 1991

[54] WATER TREATMENT SYSTEM

[75] Inventors: Keith E. Brown, Solon; Lyle E. Kirman, Cleveland Heights, both of Ohio

[73] Assignee: Kinetico, Incorporated, Newbury, Ohio

[21] Appl. No.: 451,094

[22] Filed: Dec. 15, 1989

[51] Int. Cl.$^5$ .............................................. C02F 1/42
[52] U.S. Cl. ................................. 210/87; 210/96.1; 210/143; 210/190; 210/241; 210/269; 210/284
[58] Field of Search ................... 210/87, 88, 93, 96.1, 210/98, 102, 105, 134, 141-143, 190, 191, 241, 264, 269, 284

[56] References Cited

U.S. PATENT DOCUMENTS

| 4,104,158 | 8/1978 | Davis | 210/139 |
| 4,385,357 | 5/1983 | Davis et al. | 364/500 |
| 4,470,911 | 9/1984 | Reinke | 210/143 |
| 4,539,106 | 9/1985 | Schwartz | 210/143 |
| 4,568,465 | 2/1986 | Davis et al. | 210/662 |
| 4,659,460 | 4/1987 | Muller et al. | 210/241 |

OTHER PUBLICATIONS

Hand-Out published by Water Refining Industrial Describing "Continuosequence Systems".

Hand-Out published by Orion Industrial Relating to Management of Cation Exchange Systems.

Primary Examiner—Ivars Cintins
Attorney, Agent, or Firm—Watts, Hoffmann, Fisher & Heinke Co.

[57] ABSTRACT

A water treatment system including a plurality of treatment tanks containing a water treatment material and defining a fluid flow path through the material extending between a first tank port and a second tank port. A first remotely controlled three way valve associated with the first tank port controls the fluid communication of a source manifold and a regeneration discharge manifold with the first tank port of each tank. A second, remotely controlled three way valve controls the fluid communication of a product receiving manifold and a regeneration chemistry supply manifold with the second port of each tank. A regeneration control monitors the loading of each tank and initiates regeneration in a given tank when that tank reaches a predetermined exhaustion level. A regeneration anticipator is operative to initiate early regeneration of a given tank if it determines that a second tank will reach exhaustion before the first tank completes its regneration, if the first tank is allowed to proceed to the predetermined exhaustion level. The treatment tanks form part of a subassembly mounted on a common platform which is skid mounted to facilitate movement and service.

26 Claims, 4 Drawing Sheets

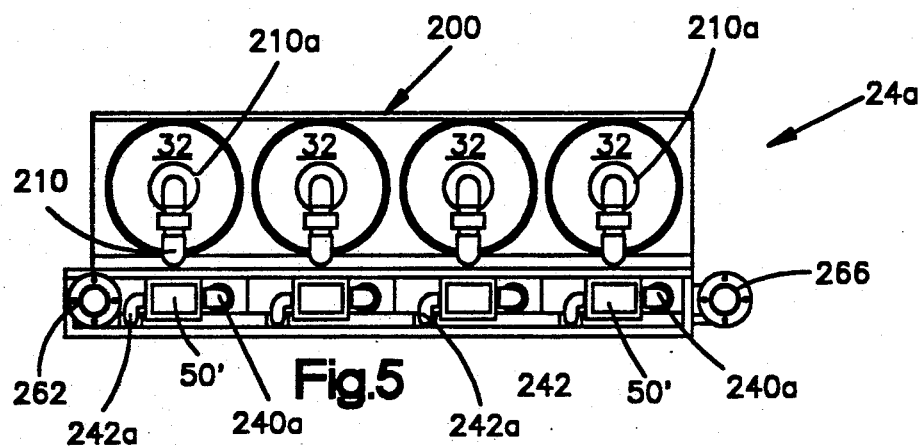
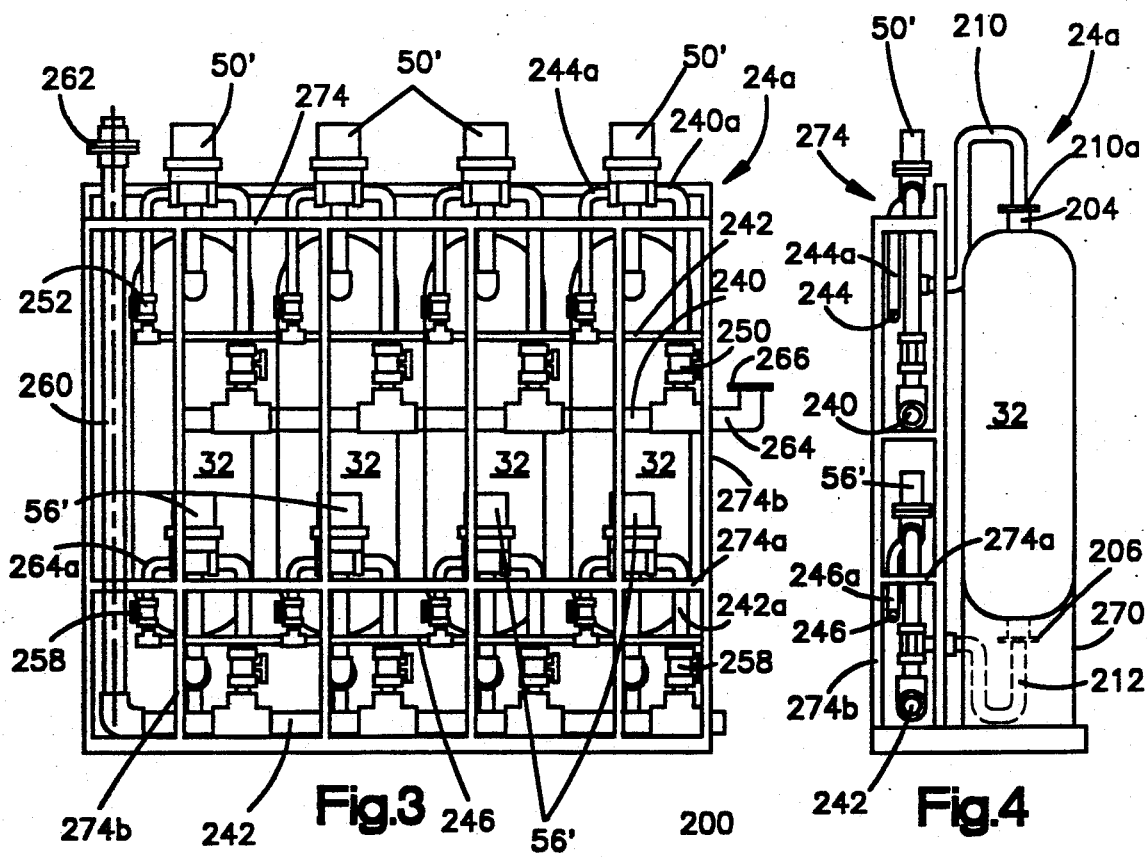

WATER TREATMENT SYSTEM

TECHNICAL FIELD

The present invention relates generally to water treatment systems and in particular to a water treatment system having multiple resin tanks and a control arrangement for regenerating the resin tanks without substantially reducing the flow rate through the treatment system during a regeneration cycle.

BACKGROUND ART

Water treatment systems such as water softeners and deionizers are used in both industrial and residential applications. In the case of residential applications, water treatment units are typically small in size and include one or two resin tanks which treat the incoming water. When a single resin tank is used, water service to the household is usually interrupted when regeneration is needed. In a two tank treatment system continuous water service is provided by having one tank on-line at all times. The other tank is regenerated and maintained off-line until the first tank is exhausted and requires regeneration.

Water treatment units used in industrial applications usually operate on the same principal as residential treatment units. However, for at least some industrial applications, the quantity of treated water needed mandates either a much larger resin tank or a multiplicity of tanks in order to support the required flow rate.

When a single resin tank is used in an industrial application, it normally must be very large in order to provide sufficient service time before requiring regeneration. When regeneration is required, the flow of regeneration chemistry and rinse water out of the tank can be substantial and may require the need for even larger equipment to treat the regeneration effluent. In a single vessel system, the required treatment equipment for the regeneration effluent can be very costly and remains idle most of the time.

When multiple tanks are employed, the flows of regeneration waste are smaller than those for a single tank system and therefore the equipment needed to deal with the regeneration chemistry discharged during a regeneration cycle can be smaller. However, with this type of treatment system, it can be difficult to maintain water quality since with prior art systems, it is difficult to insure that a given tank is taken off-line and regenerated before reaching exhaustion. At least with some prior art systems, it is possible for a second tank to reach exhaustion while a first tank is still in a regeneration cycle. If this should happen, water quality will suffer substantially if the second exhausted tank is left on-line. Alternately, if the second tank is taken off line, the flow rate of treated water will be substantially reduced (if the system includes three or more tanks) or will be terminated (if the system includes only two tanks).

One suggested way of avoiding this type of problem is to regenerate the tanks in sequence and at an interval that will insure that each tank is regenerated well before it is exhausted. With this type of control, regeneration normally occurs more frequently than needed and as a result, excessive regeneration chemistry may be consumed which substantially raises the cost of operating the system. The increase cost is not only due to the cost of the excess chemistry used, but also the cost associated with the treating of the regeneration waste discharged during the regeneration cycle. As indicated above, it is quite common to use supplementary treatment equipment to treat the regeneration discharge. As the quantity of regeneration chemistry increases, the cost associated with treating this regeneration effluent also increases.

DISCLOSURE OF THE INVENTION

The present invention provides a new and improved water treatment system which utilizes multiple resin tanks or vessels that are normally maintained on-line in a parallel flow relationship in order to provide a large flow rate capacity. A system controller monitors at least one influent parameter for each tank such as flow rate and based on this information continuously calculates the "loading" (the extent of depletion) of each of the resin tanks in the system. Based on the monitored information, the controller initiates regeneration in a given resin tank whenever it reaches a predetermined exhausted state or at an earlier time if the controller determines a second tank will reach exhaustion before regeneration is completed in the first tank.

With the disclosed treatment system and control scheme, only one resin tank is regenerated at any given time and the controller substantially insures that a given tank will not reach complete exhaustion during the regeneration of another tank. As a result, high quality water is maintained at all times and the maximum flow rate though the system is maintained since at any given time only one tank is off-line.

Moreover, since only one tank is regenerated at any given time, the equipment needed to treat the regeneration effluent can be minimally sized since the flow rate of regeneration chemistry is relatively small. In addition, the regeneration effluent flow occurs at more frequent intervals and as a result, efficient use of supplementary treating equipment (for treating the regeneration effluent) is realized.

According to one aspect of the invention, the system controller constantly monitors the quantity of fluid treated by a given tank and continuously calculates the "loading" of the resin bed. The term "loading" should be recognized in the industry as a term that denotes or is related to the number of sites available in the resin bed to capture a desired ion or other material. For an ion exchange resin the maximum "loading" is a function of the maximum number of ions that can be captured by the resin bed. For other types of resins such as polymeric adsorbents, the maximum "loading" is a function of the maximum number of particles that can be captured by the resin. The maximum loading of a given resin tank is determined by the type of resin used and the quantity of resin in the tank. The capacity or loading of a tank may also be affected by the kinds of ions or material being trapped.

According to a feature of the invention, the system controller includes an anticipation feature which is operative to initiate an early regeneration of a given tank if the controller determines that a second tank will reach exhaustion before the first tank completes regeneration, if regeneration of the first tank is delayed until it reaches exhaustion. This anticipation feature is achieved by continuously comparing the accumulated loading of each tank with a intermediate load value determined by the following equation:

$$L_1 = L_{max} - (F_{max} \times C_{max} \times T \times K_1)$$

Where:
- $L_{max}$ = maximum loading of a given tank;
- $F_{max}$ = the maximum system flow rate;
- $C_{max}$ = maximum concentration of ions in the influent fluid;
- T = time required for completing regeneration;
- $K_1$ = correction factor for unbalanced flow rates between the tanks (typically between 0.9 and 1.2).

According to this feature of the invention, if any two treatment tanks have a remaining capacity less than or equal to $L_1$, the system controller immediately initiates regeneration of the tank having the lowest remaining capacity. In this way, the maximum treatment capacity of any tank is never exceeded.

According to a further feature of this aspect of the invention, the system controller compensates for an early regeneration of a given tank by adjusting the volume of regeneration chemistry communicated to the tank during regeneration. The amount of chemistry that will be delivered to the tank about to be regenerated is determined by the following equation:

$$V(\text{volume}) = V_{max} - V_{max}(L_{max} - L_{actual})/L_{max}$$

Where
- V = volume of regeneration chemistry to be delivered to the tank being regenerated.
- $V_{max}$ = maximum volume of regeneration chemistry that would be delivered to a fully exhausted vessel
- $L_{max}$ = maximum vessel loading
- $L_{actual} = L_{max}(F_{actual} \times C_2)$ where $C_2$ is a concentration factor of the influent fluid and $F_{actual}$ = the average flow rate of the source fluid processed since the last regeneration.

According to another feature of the invention, an ion treatment unit is disclosed which is easily installed, serviced and maintained. In particular, when the disclosed invention is used as part of a deionization system, ion exchange subassemblies are assembled and tested at the manufacturing location and are then brought to the installation site. Installation involves positioning each ion exchange subassembly, making the appropriate plumbing connections to the influent and effluent lines and connecting the unit to a source of power and to the system controller.

With the disclosed system construction, installation of a resin tank type treatment system such as a deionization system can be easily accomplished. Moreover, maintenance and service are facilitated.

According to this feature of the invention, three or more resin tanks or vessels are mounted in a vertical, juxtaposed relationship on a common base or platform. Preferably, the tanks are all of the same size, shape and volume and each tank defines a first port at one end and a second port at an opposite end. The subassembly includes four manifolds namely a influent manifold for communicating influent (to be treated) to each of the tanks, a product manifold for receiving treated fluid from each of the treatment tanks, a regeneration chemistry manifold for supplying regeneration chemistry to each tank and a regeneration discharge manifold for receiving regeneration chemistry (and at least some rinse fluid) from a tank during a regeneration cycle.

In the preferred and illustrated embodiment, each tank includes a first and second valve associated with the first and second ports. In the illustrated embodiment, each valve comprises a motor driven three way valve which selectively communicates one of two manifolds to its associated port. In the illustrated embodiment, the first three way valve controls the communication of the influent manifold and regeneration discharge manifold with the first port of its associated tank and the second valve controls the communication of the product manifold and regeneration chemistry manifold with the second port of its associated tank.

When a given tank is in service, the first valve communicates the source manifold with the first port and the second valve communicates the second port with the product manifold. In this configuration, fluid to be treated enters the first port of the tank, travels through the resin material and exits the tank through the second port and is received by the product manifold.

When regeneration of a given tank is necessary, the first valve terminates communication between the source manifold and the first port and then communicates the first port with the regeneration chemistry discharge manifold while the second valve communicates the regeneration chemistry supply manifold with the second port. Regeneration chemistry, communicated to the regeneration manifold from a regeneration solution source, then travels in a reverse flow direction through the tank and is discharged into the regeneration discharge manifold through the first port.

Rinsing of the resin is then achieved through a valving arrangement which communicates treated fluid from the product manifold to the regeneration chemistry manifold while terminating the flow of regenerant chemistry from the regeneration solution source. Downflow rinse may also be supported using valving for communicating treated fluid to the first port of a tank being regenerated.

With the disclosed invention, a continuously operating fluid treatment system is provided. With the disclosed control arrangement, product quality is maintained throughout system operation while at the same time maximizing the flow rate of the system.

Additional features of the invention will become apparent and a fuller understanding obtained by reading the following detailed description made in connection with the accompanying drawings.

BRIEF DESCRIPTION OF THE DRAWINGS

FIG. 3 is a side elevational view of an ion exchange subassembly constructed in accordance with the preferred embodiment in the invention;

FIG. 4 is an end view of the ion exchange subassembly shown in FIG. 3; and,

FIG. 5 is a top view of the ion exchange subassembly shown in FIG. 3.

BEST MODE FOR CARRYING OUT THE INVENTION

Figure 1:
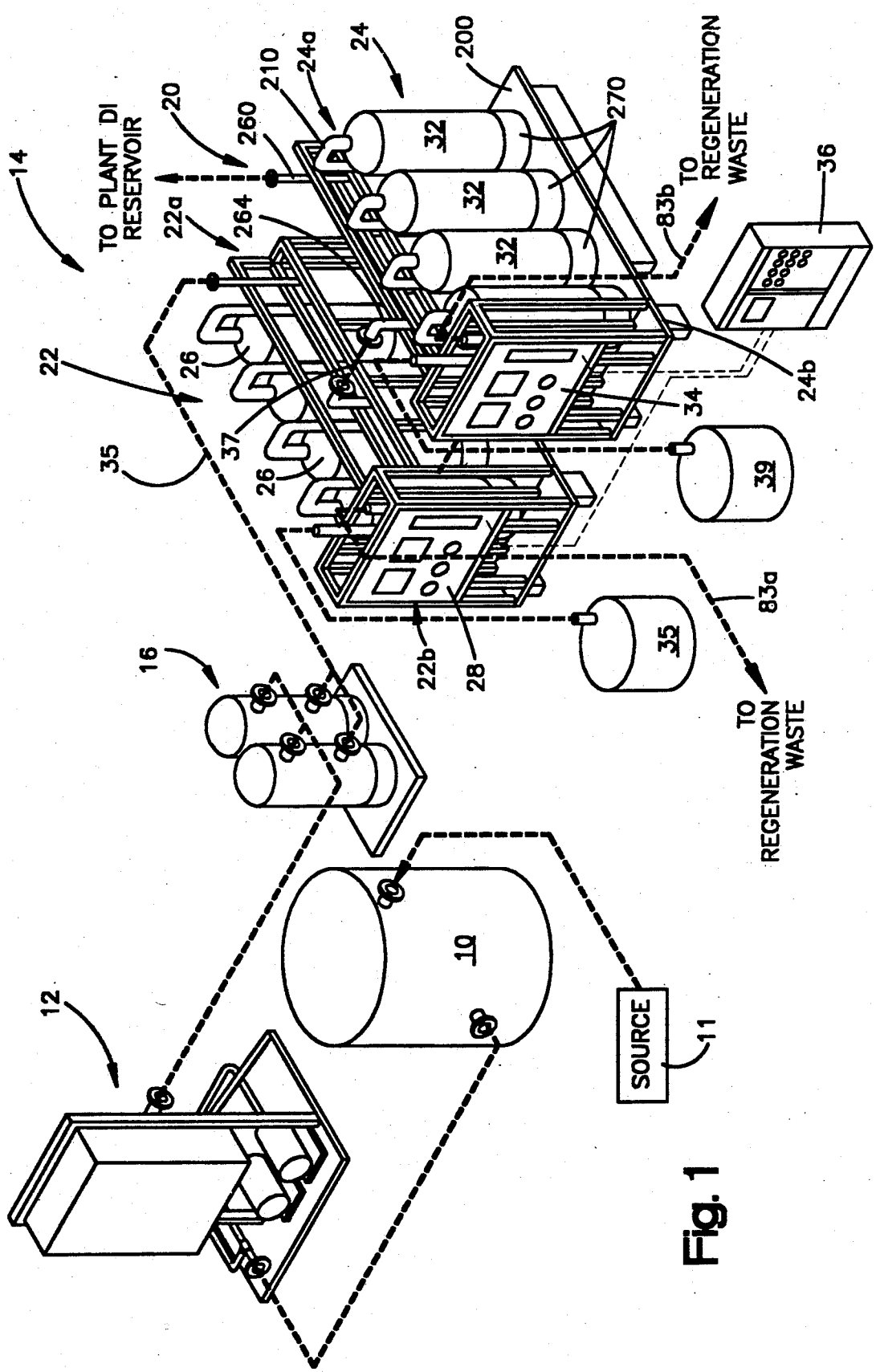
FIG. 1 is a perspective view of an overall industrial, water treatment system embodying the present invention.

FIG. 1 illustrates the overall construction of a large scale water treatment system embodying the present invention. The invention is being disclosed as part of a plant deionization system. It should be understood however, that the present invention can be adapted to a variety of water treatment applications and should not be limited to the disclosed deionization application.

The disclosed water treatment system includes a holding tank 10 for receiving and/or accumulating raw water to be treated from a source 11, a pump unit 12 for drawing water from the holding tank 10 and pumping it through a water treatment process line, indicated generally by the reference character 14. The overall process line 14 may include a variety of water treatment devices such as mechanical filters (not shown) or carbon filters 16 for removing solids from the raw water before the water enters a deionization unit 20 constructed in accordance with the present invention.

The deionization unit 20 includes a pair of skid mounted cation and anion subassemblies 22, 24. In the illustrated embodiment, the cation skid 22 includes four resin tanks 26, a control panel 28 and all the necessary piping and valving for interconnecting the cation tanks 26 and for controlling the regeneration of an exhausted tank.

The anion subassembly 24 is similarly configured and includes four anion tanks 32, an associated control panel 34 and piping and valving necessary to interconnect the tanks 32 with each other and with the control panel 34.

In accordance with the invention, each skid mounted unit is self contained. In order to place the deionization system into operation, the cation and anion units 22, 24 are moved into position. The cation unit 22 is connected to the source of water to be treated via conduit 35, to the anion unit 24, to a source of regeneration chemistry 35 and finally to a source of power and/or to a system controller 36. With the disclosed construction, all the inter-tank plumbing connections and electrical connections are completed during the manufacture of the unit so that upon delivery, only a minimal number of connections need to be made in order to place the system in service.

The anion unit requires only a minimal number of connections as well. In particular, an input to the anion unit 24 must be connected to the output of the cation unit 22 via conduit 37. The output of the anion unit is connected to a plant supply conduit 38. A source of regeneration chemistry 39 is connected to the unit 24 and finally a connection is made to a source of power and/or the system controller 36.

Referring again to FIG. 1, to further facilitate installation and maintenance, the ion exchange subassemblies 22, 24 are actually divided into two sections. In particular, the cation assembly 22 is divided into a tank section 22a and a regeneration section 22b. Similarly, the anion unit 24 is actually made up of two separate pre-assembled sections, namely a tank section 24a and a regeneration section 24b. During installation, the respective cation sections 22a, 22b and the anion sections 24a, 24b are interconnected. By mounting the sections on skids or pallets, transport and movement of the units are facilitated as well as maintenance and service. It should be understood, however, that for some applications the tank and regeneration sections may be mounted on a common platform.

With the disclosed skid mounting of the cation and anion units, the deionization system can be easily installed with the minimal amount of effort and time. Moreover, the units can be easily moved or replaced if necessary.

Figure 2A:
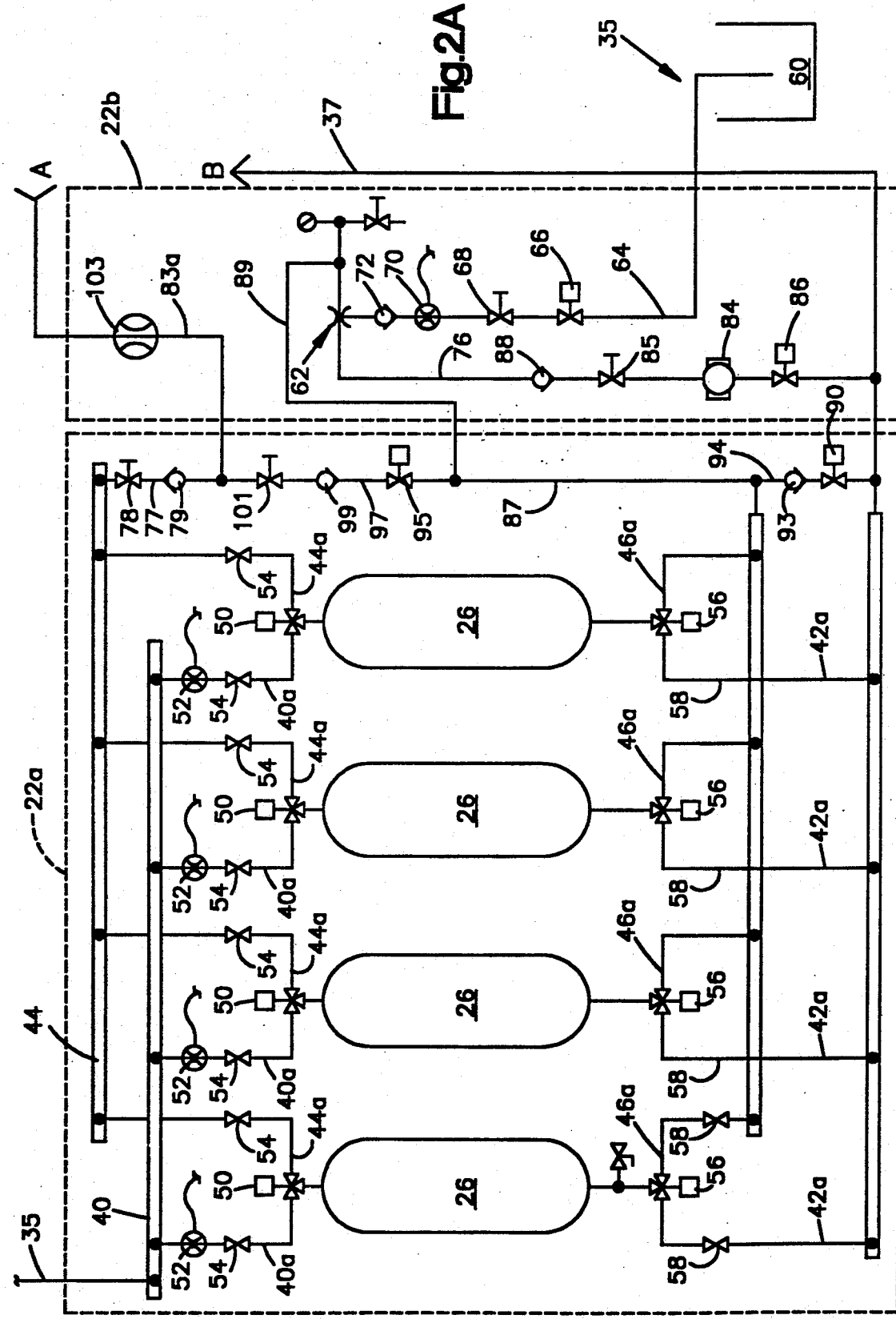
FIGS. 2A and 2B together form a schematic representation of a portion of the treatment system shown in FIG. 1.
Figure 2B:
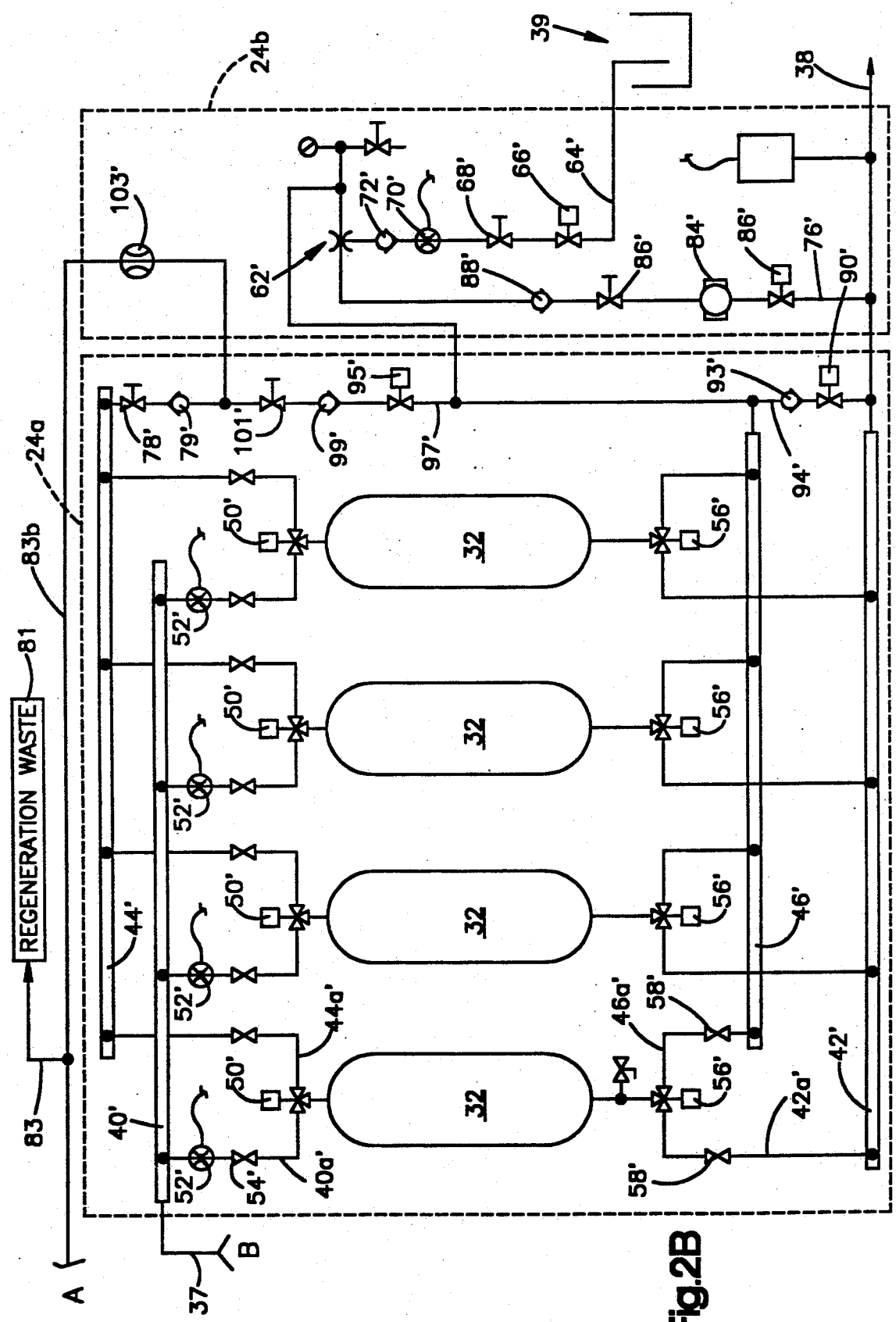

FIGS. 2A and 2B illustrate, schematically, the construction of the water treatment system. The cation and anion units 22, 24 are similarly configured. In the illustrated construction, four resin tanks are employed in each of the ion exchange subassemblies. It should be understood, however, that the invention is not limited to four tanks and may include three or more tanks.

In addition, the present invention is being described in connection with a deionization process. The invention itself is not limited to deionization processes and is equally applicable to water softening systems or any other water treatment system in which water to be treated is passed through a treatment material that requires periodic regeneration. For example the present invention is adaptable to a water treatment system that employs a polymeric adsorbent for removing organic material from an aqueous stream. An adsorbent resin is available from Rohm And Haas Company and is sold under the trademark Amberlite.

Referring to FIG. 2A, the cation subassembly 22 includes the tank section 22a and the regeneration section 22b. The tank section 22a includes four cation tanks 26, each containing a suitable cation resin. Fluid connections are made to the top and bottom of each tank 26. The subassembly 22 also includes four manifolds 40, 42, 44, 46 to which each tank 26 is connected through valving and conduits to be described. The manifolds 40, 42, 44, 46 may each comprise a common conduit to which each tank 26 is connected.

The manifold 40 is an influent manifold and is connected to the source conduit 35 by a standard plumbing connection 48 (shown in FIG. 1). In the illustrated apparatus, the source conduit 35 is connected to the output of the carbon filters 16. The source conduit 35 delivers water to be treated to the influent manifold 40. The communication of water to be treated from the manifold 40 to a given tank 26 is controlled by a motorized three-way valve 50 and a branch conduit 40a. In the illustrated embodiment, the branch conduit 40a includes a flow sensor 52 for monitoring the quantity of fluid delivered to an associated tank 26. The branch conduit 40a may also include a manual shut-off valve 54 for isolating the influent manifold 40 from a tank 26 when the tank is being serviced or replaced.

The manifold 42 is a "product" manifold. The bottom of each tank 26 is connected to the product manifold 42 by way of a branch conduit 42a and a motorized three-way valve 56. Each branch conduit 42a may include a manual shut-off valve 58 for isolating a tank 26 from the product manifold 42.

When a given tank 26 is in service and treating water, the motorized valves 50, 56 are operated by the system controller 36 (to be described) which causes the branch conduit 40a to be placed in fluid communication with the top of the tank 26 and the branch conduit 42a to be placed in fluid communication with the bottom of the tank 26. Water to be treated is delivered from the influent manifold 40 to the top of the tank by way of the three-way valve 50 and the branch conduit 40a. The water travels through the tank and is delivered to the product manifold 42 by way of the valve 56 and the branch conduit 42a.

The top of each tank 26 is also connected to the regeneration discharge manifold 44 by means of a branch conduit 44a. The bottom of each tank 26 is connected to the regeneration solution delivery manifold 46 by means of a branch conduit 46a. The fluid communication between the tank 26 and the branch passages 44a, 46a are also controlled by the three-way valves 50, 56. When a tank 26 requires regeneration, the three-way valve 50 is operated to terminate the fluid communication between the top of the tank 26 and the branch conduit 40a and is moved to a position at which the top of the tank 26 is communicated with the branch passage 44a. The three-way valve 56 is operated to terminate communication between the bottom of the tank 26 and the branch passage 42a and is then rotated to a position at which the bottom of the tank 26 is placed in fluid communication with the branch conduit 46a. With the three-way valves 50, 54 positioned as described, regeneration solution from the regeneration solution source indicated generally by the reference character 35, is communicated to the tank being regenerated. The solution flows upwardly through the tank and is discharged through the conduit 44a.

As indicated above, regeneration solution is communicated to the regeneration supply manifold 46 from the regeneration chemistry source 35. In the illustrated embodiment, the regeneration solution source comprises a reservoir of regeneration chemistry 60 which is connected to an aspirator or eductor 62 through a conduit 64 which includes a control valve 66, metering valve 68, a flow sensor 70 for monitoring the quantity of regenerant chemistry delivered to the eductor and a check valve 72 for inhibiting reverse flow along the conduit 64. The regeneration solution that is delivered to a tank being regenerated is created by passing product water through the eductor 62 which as is known, draws regeneration chemistry from the conduit 64. Product or in this case de-cationized water is delivered to the eductor 62 through a conduit 76 which is connected to the product manifold 42.

The resulting regeneration solution is communicated to a tank 26 that is being regenerated by way of the regeneration supply manifold 46, the associated branch conduit 46a and the associated three-way valve 56. After traveling through the treatment material in the tank 26, the solution leaves the top of the tank through the valve 50, the branch conduit 44a and is received by the regeneration discharge manifold 44. This regeneration waste leaves the discharge manifold 44 through a branch conduit 77 which includes a throttling valve 78 and a check valve 79. From the conduit 77, the waste is communicated (by a transfer conduit 83) to a waste receiver 81 (shown in FIG. 2b) which may comprise supplementary treatment equipment or a drain. It should be noted here that in the schematic representation provided by FIGS. 2A and 2B, the transfer conduit 83 is shown as a interconnecting, common conduit between the cation and anion sections 22, 24 whereas in FIG. 1, separate transfer conduits 83a, 83b are shown.

In the illustrated embodiment, the conduit 76 includes a booster pump 84, a control valve 86, a metering valve 85 and a check valve 88 to prevent reverse flow along the conduit. When the valve 56 is operated to communicate the branch conduit 46a with the bottom of the tank, the valve 86 is opened to allow product water to flow along the conduit 76 to the eductor 62 and into the bottom of the tank being regenerated via conduit 87 and conduit 89. Once sufficient regeneration chemistry has been delivered to the eductor, the valve 86 is operated to terminate flow of regeneration chemistry from the reservoir 60 and a slow rinse may then be initiated by allowing the flow of product water to continue through the eductor 62, the conduits 87 and 89, manifold 46 and into the bottom of the tank 26. Alternately, a fast or high flow rate upflow rinse can be effected by opening a valve 90 which communicates the product manifold 42 directly to the regeneration supply manifold 46 through a branch conduit 94. When the valve 90 is opened, the regeneration circuit is bypassed and product water is allowed to flow directly from the manifold 42 to the manifold 46 via the conduit 94 (which includes a check valve 93 to prevent reverse flow) from where it is communicated to the tank being regenerated through the conduit 46a.

The disclosed system also has a provision for a downflow rinse, utilizing the source fluid as a rinsing agent. According to this feature, when a downflow rinse is desired, as part of the regeneration cycle, the valve 50 of the tank being regenerated is operated to communicate the source manifold 40 via the branch conduit 40a with the top of the tank 26. The lower valve 56 of the tank being regenerated, however, is left in the position at which it communicates the regeneration supply manifold 46 with the lower end of the tank (via the branch passage 46a). A downrinse control valve 95 disposed in a conduit segment 97 is then opened. The downflow rinse fluid (source fluid from the source manifold 40) travels down through the tank 26 being regenerated, is received by the regeneration supply manifold 46, travels up the conduit 87, through the intermediate conduit 97 and into the transfer conduit 83. The conduit 97 includes a check valve 99 to prevent reverse flow along the conduit 97 and a throttling valve 101 to adjust the flow rate of the rinse. In order to adjust the flow rate of both the downflow rinse (using the throttling valve 101) or the upflow rinse (using the throttling valve 78), a flow meter 103 is positioned in the conduit 83 so that the flow rate of the rinse water (whether it be an upflow or downflow rinse) can be measured.

In normal operation, all four tanks are in service and are actively treating fluid conveyed to the top of each tank by the associated branch conduit 40a. The quantity of fluid treated by a given tank is constantly monitored by the flow sensor 52. A Series 200 sensor and model 500 transmitter available from Data Industrial may be used to monitor the flow of fluid into each treatment tank. The system controller uses the influent information provided by the flow sensor to continuously calculate the "loading" of an associated treatment tank. Those skilled in the art will recognize the term "loading" to mean a quantity related to the number of sites in the resin bed containing a trapped ion (in the case of an ion exchange media) or a trapped particle (in the case of an organic adsorbent media). It should be understood that a given resin bed can trap a predetermined number of ions or particles at which point the resin is then considered exhausted and then requires regeneration.

It should be noted here that in normal operation a resin tank is usually regenerated before "complete" exhaustion occurs. By complete exhaustion it is meant that every available site in the resin contains a trapped ion or particle. In order to maintain high quality output from a tank, it is has been found that the resin should be regenerated prior to "complete" exhaustion. It should therefore be understood, that the "maximum loading" of a tank is normally selected to be less than complete exhaustion (i.e. all available sites have trapped an ion or particle). Therefore the term "maximum exhaustion level" as used herein indicates the loading level a tank is allowed to proceed to before regeneration is initiated. To maintain high output quality from the system, this maximum level is less than complete exhaustion of the resin bed, in normal operation.

According to the invention, the system controller includes an anticipation feature which operates to initiate an early regeneration of a given tank if the controller determines that a second tank will reach its maximum exhaustion level before the first tank is regenerated, if the first tank is allowed to continue to complete exhaustion. The system controller accomplishes this anticipation by continuously comparing the accumulated loading of each tank with an intermediate value defined by the equation:

$$L_1 = L_{max} - (F_{max} \times C_{max} \times T \times K_1)$$

Where
$L_{max}$ = maximum loading of a given tank
$F_{max}$ = the maximum system flow rate
$C_{max}$ = maximum concentration of ions in the influent fluid
T = time required for completing regeneration
$K_1$ = correction factor for unbalanced flow rates between the tanks (typically between 0.9 and 1.2).

According to this control, if any two tanks have a calculated loading value less than or equal to $L_1$, the controller immediately initiates regeneration of the tank with the lowest remaining capacity so that it will be back in service before the second tank reaches exhaustion.

According to the preferred embodiment, the system controller also compensates for an early regeneration of a given tank by adjusting the volume of regenerant chemistry communicated to that tank during regeneration. According to this feature, the system controller calculates the amount of regenerant chemistry to be communicated to the tank using the following formula:

$$V(volume) = V_{max} - V_{max}(L_{max} - L_{actual})/L_{max}$$

Where
V = volume of regeneration chemistry to be delivered to the tank being regenerated.
$V_{max}$ = maximum volume of regeneration chemistry that would be delivered to a fully exhausted tank.
$L_{max}$ = maximum vessel loading.
$L_{actual} = L_{max}(F_{actual} \times C_2)$ where $C_2$ is a concentration factor of the influent fluid and $F_{actual}$ = the average flow rate of the source fluid processed since the last regeneration.

With this feature, regeneration chemistry is conserved when a tank is regenerated prior to reaching its maximum exhaustion level.

The cation and anion tank sections (shown in FIGS. 1, 2A and 2B) are similarly, if not identically, constructed. The components of the anion subassembly 24 which are identical or similar to components used in the cation subassembly 22 are indicated by the same reference character followed by an apostrophe. As seen in FIG. 2B, the anion subassembly 24 is divided into a tank section 24a and a regeneration section 24b. The output of the cation unit 22 is conveyed to the anion unit 24 by the transfer conduit 37. The output of the anion unit is communicated to the plant DI reservoir through a supply conduit 38. In the illustrated embodiment, the quality of the treated water is monitored by a sensor 100 which may comprise a resistivity monitor.

In the disclosed embodiment, the regeneration frequency is determined by monitoring the flow of fluid treated by each tank so that the frequency is directly related to the volume of source fluid passed through each tank. A "feed forward" type control can also be employed to control the frequency of regeneration of a tank. An example of a feed forward control that can be adapted to the disclosed deionization system is fully disclosed in co-pending application Ser. No. 07/334,453, filed Apr. 6, 1989, which is hereby incorporated by reference. To implement the feed forward control of the disclosed application, a sensor for monitoring "quality related" parameters of the source water would be added to the system. An example of such a sensor would be a conductivity sensor which would monitor the variation in ion content of the incoming water and adjust the frequency of regeneration based on the quantity of fluid treated by a tank and the conductivity of that fluid. In other words, the feed forward control continuously calculates the number of grains processed by a tank using flow and conductivity information which is more fully explained in the above identified application.

Turning now to FIGS. 3-5, the construction of a resin tank section is illustrated. As indicated above, the cation and anion subassemblies and hence the respective tank sections, are similarly constructed. For purposes of explanation, the construction of the apparatus shown in FIGS. 3-5 will be described as the anion tank section 24a shown in FIG. 1.

In the illustrated embodiment, the anion exchange tank section 24a includes four elongate ion exchange resin tanks 32 mounted in a vertical, juxtaposed relationship on a common base or skid 200 (shown best in FIG. 1). The actual unit may be "pallet" mounted to facilitate positioning and movement using conventional industrial equipment such as forklifts. Each tank 32 includes a top port 204 and a bottom part 206. The top port is connected to an associated, motor driven three way valve 50' (shown schematically in FIG. 2B) through a short connecting conduit 210 including a releasable coupling 210a for facilitating disconnection of the tank 32 from the subassembly 24a. The bottom port 206 is connected to the lower motorized three way valve 56' by a connecting conduit 212.

In the illustrated construction the manifolds 40', 42', 44', 46' (shown in FIG. 2A) are defined by transversely extending conduits 240, 242, 244 and 246, respectively. The source water manifold/conduit 240 is connected to each upper three way valve 50' by means of branch piping 240a. The branch piping may include a hand operated valve 250 for isolating a given tank during service. The regeneration discharge manifold/conduit 244 is connected to each three way valve 50' by branch piping 244a which may also include a hand valve 252.

The product receiving manifold/conduit 242 is connected to each lower three-way valve 56' by branch piping 242a. The regeneration chemistry manifold/conduit 246 is connected to each lower three-way valve 56' through a branch piping 246a. Both branch pipes 242a and 244a may include a hand valve 258 for isolating the lower end of each tank 32 for service. The product manifold 242 includes an upwardly extending supply conduit 260 including a flange-type plumbing connection 262 for coupling the anion exchange section to the plant supply line 38 or to another treatment unit. Decationized water from the cation subassembly 22 is delivered to the source manifold/conduit 240 through a delivery pipe 264 including a flange connection 266. The delivery pipe 264 is connected to the output of the cation unit by the transfer conduit 37 (shown schematically in FIGS. 1, 2A and 2B). The disclosed arrangement and connections further facilitates the installation of a given ion exchange subassembly unit.

Each tank is supported on a base 270 which in turn is attached to the support platform 200. A grid-like structure 274 including transverse and vertical members 274a, 274b, supports the various conduits, manifolds and valving, and provides a relatively rigid but compact unit that is easily installed and serviced.

Referring to FIG. 1, each ion exchange subassembly includes the associated control panels 28, 34. Both panels, in turn, interface to the system control panel 36. In the illustrated embodiment, the control panels 28, 34 include valving and plumbing for controlling the regeneration of an exhausted tank. Each control panel is connected to the associated regeneration chemistry. In particular and as seen in FIG. 1, the cation unit 22 is connected to a cation regeneration solution reservoir which typically comprises an acid-based chemical whereas the anion unit 24 is connected to the anion regeneration solution reservoir which is normally caustic based.

Each control panel 28, 34 includes the support equipment for receiving data from the various flow sensors and a programmable controller for monitoring the loading of each tank, for determining when regeneration is necessary and for executing a regeneration cycle for an exhausted tank. In particular, the controller associated with each ion exchange unit is operative to control the upper and lower motorized, three way valves associated with each tank as well as the valves associated with the source of regeneration chemistry.

Although the invention has been described with a certain degree of particularity, it should be understood that those skilled in the art can make various changes to it without parting from the spirit of scope of the invention as hereinafter claimed.

We claim:

1. A water treatment apparatus, comprising:
   a) at least three treatment tanks, each tank being provided with means defining a first port and second port and containing a treatment material defining a fluid flow path between said first and second ports;
   b) a first valve means in fluid communication with said first port of each tank and a second valve means in fluid communication with said second port of each treatment tank;
   c) a source fluid manifold for delivering fluid to be treated to said tanks, said source manifold in fluid communication with each of said first valve means;
   d) a treated fluid receiving manifold for receiving treated fluid from said treatment tanks, said treated fluid receiving manifold in fluid communication with each of said second valve means;
   e) a regeneration chemical supply manifold for delivering a regeneration chemical to a treatment tank requiring regeneration, said regeneration supply manifold in fluid communication with each of said second valve means;
   f) a regeneration chemical discharge manifold for receiving regeneration related fluids from said tanks, said regeneration discharge manifold in fluid communication with each of said first valve means;
   g) said first valve means of each tank operative to selectively communicated either said source manifold or said regeneration chemical discharge manifold with said first port of its associated tank;
   h) said second valve means of each tank operative to selectively communicate either said treated fluid receiving manifold or said regeneration chemical supply manifold with its associated second port;
   i) regeneration control means for controlling a regeneration cycle for an exhausted tank including means for monitoring the exhaustion level for each of said of tanks and operative to initiate regeneration upon determining that a tank has reached a predetermined exhaustion level or upon determining that a second tank will reach said predetermined exhaustion level unless said first tank is regenerated immediately.

2. The apparatus of claim 1, wherein said first and second valve means comprise three way remotely controlled valves.

3. The apparatus of claim 2, wherein each of said tanks comprises an elongate upstanding, cylindrical structure and said tanks are positioned in a vertical, juxtaposed position supported by a common platform and said first and second ports are defined at opposite ends of each tank.

4. The apparatus of claim 3, wherein said first port is defined near a top end of said tank and said second port is defined near a bottom end of said tank.

5. The apparatus of claim 4, wherein said source, treated fluid, regeneration supply and regeneration discharge manifolds comprise transversely extending common conduits coupled to said three way valves through branch conduits associated with each tank.

6. The apparatus of claim 5, further including a flow sensor disposed in each branch conduit connecting said source fluid manifold with an associated tank.

7. The apparatus of claim 6, further comprising a source of regeneration solution including valve means for selectively communicating said source of regeneration solution with said regeneration supply manifold.

8. The apparatus of claim 7 further comprising regeneration adjustment means for reducing the quantity of regeneration solution communicated to a tank being regenerated, if said tank is being regenerated prior to reaching said predetermined exhaustion level.

9. The apparatus of claim 1, wherein said tanks each contain a cation resin and form a cation section of a deionization system.

10. The apparatus of claim 1, wherein said tanks each contain an anion resin and form an anion section of a deionization system.

11. A water treatment system, comprising:
   a) structure supporting at least three treatment tanks, each tank containing a treatment material and defining a fluid flow path between a first port and a second port;
   b) valve means in fluid communication with said first port and said second port of each tank;
   c) said valve means operative to control the communication of water to be treated, to said tanks and the communication of regeneration fluid to a tank requiring regeneration, and
   d) regeneration control means for initiating regeneration of a treatment tank, comprising:
      i) monitoring means for determining an actual load value of each treatment tank;
      ii) comparing means operative to continuously compare said actual load value of each tank with an intermediate load value defined by the equation:

$$L_1 = L_{max} - (F_{max} \times C_{max} \times T \times K_1)$$

Where
$L_{max}$ = maximum loading of a given tank;
$F_{max}$ = the maximum system flow rate;

$C_{max}$ = maximum concentration of material to be captured in the influent fluid;

T = time required for completing regeneration;

$K_1$ = correction factor for unbalanced flow rates between the tanks;

iii) regeneration anticipation means operative to initiate immediate regeneration of a tank if said comparing means determines that two or more tanks have an actual load value less than or equal to said intermediate load value.

12. The apparatus of claim 11, wherein said treatment tanks are mounted on a movable skid and said valve means comprises first and second remotely controlled three-way valves in fluid communication with said first and second tank ports of each tank.

13. The apparatus of claim 12, wherein said skid mounted tanks form a subassembly further including a source water manifold, a product receiving manifold, a regeneration supply manifold and a regeneration discharge manifold and said first and second valves control the communication of said manifolds with each of said tanks.

14. The apparatus of claim 11 further including a regeneration chemical adjustment means operative to reduce the quantity of regeneration solution communicated to a tank if regeneration is initiated in said tank by said anticipation means before said tank has reached a predetermined exhaustion level.

15. The apparatus of claim 14, wherein said regeneration chemical adjustment means causes a reduced volume of regeneration fluid to be communicated to a tank being regenerated, the quantity of regeneration fluid being determined by the following equation:

$$V(\text{volume}) = V_{max} - V_{max}(L_{max} - L_{actual})/L_{max};$$

Where:

V = volume of regeneration fluid to be delivered to the tank being regenerated;

$V_{max}$ = maximum volume of regeneration fluid that would be delivered to a fully exhausted vessel;

$L_{max}$ = maximum vessel loading;

$L_{actual} = L_{max}(F_{actual} \times C_2)$ where $C_2$ is concentration factor of the influent fluid.

16. The system of claim 11, wherein said monitoring means includes means for monitoring the quantity of fluid treated by each of said treatment tanks.

17. The system of claim 11, wherein said monitoring means includes means for monitoring the quantity of source fluid communicated to each of said treatment tanks and further includes a sensing means for sensing a characteristic of the source fluid that is indicative of the quality of the source fluid in order to provide a feed forward control in said regeneration control means.

18. The system of claim 17 wherein said sensing means comprises a water conductivity sensor.

19. A treatment tank assembly, comprising:

a) a resin tank section including:
 i) a base supporting at least three resin tanks, each of said tanks including a first and second valve means in fluid communication with first and second ports, respectively;
 ii) first and second manifold means interconnected with each of said tanks through, and in fluid communication with, said first valve means;
 iii) third and fourth manifold means interconnected with each of said tanks through, and in fluid communication with, said second valve means;
 iv) said first valve means operative to control the communication of said first and second manifold means with said first port and said second valve means operative to control the fluid communication between said third and fourth manifold means with said second port;

b) a regeneration section including a regeneration control means and conduit means for communicating regeneration fluid to one of said manifold means.

20. The apparatus of claim 19, wherein said regeneration section and resin tank section comprise separate subassemblies that are interconnected during installation.

21. The apparatus of claim 20, wherein said first and second manifold means comprise a source manifold for communicating fluid to be treated to said tanks and said second manifold means comprises a regeneration discharge manifold for receiving regeneration fluid from a tank during a regeneration cycle.

22. The apparatus of claim 20, wherein said third manifold means comprises a product receiving manifold for receiving treated fluid from said tanks and said fourth manifold means comprises a regeneration supply manifold for supplying regeneration fluid to a tank being regenerated, during a regeneration cycle.

23. A water treatment apparatus, comprising:

a) at least three treatment tanks, each tank being provided with means defining a first port and second port and containing a treatment material defining a fluid flow path between said first and second ports;

b) a first multi-way valve in fluid communication with said first port of each tank and a second multi-way valve in fluid communication with said second port of each treatment tank;

c) a source fluid manifold for delivering fluid to be treated to said tanks, said source manifold in concurrent fluid communication with all of said first multi-way valves;

d) a treated fluid receiving manifold for receiving treated fluid from said treatment tanks, said fluid receiving manifold in concurrent fluid communication with all of said second multi-way valves;

e) a first regeneration chemical manifold in concurrent fluid communication with all of said first multi-way valves;

f) a second regeneration chemical manifold in concurrent fluid communication with all of said second multi-way valves;

g) said first multi-way valve of each tank operative to selectively communicate either said source manifold or said first regeneration chemical manifold with said first port of its associated tank;

h) said second multi-way valve of each tank operative to selectively communicate either said treated fluid receiving manifold or said second regeneration chemical supply manifold with its associated second port;

i) regeneration control means for controlling a regeneration cycle for an exhausted tank including means for monitoring the exhaustion level for each of said of tanks and operative to initiate regeneration upon determining that a tank has reached a predetermined exhaustion level or upon determining that a second tank will reach said predetermined exhaustion level unless said first tank is regenerated immediately.

24. The apparatus of claim 23 wherein said first regeneration chemical manifold comprises a regeneration chemical discharge manifold for receiving regeneration related fluids from said tanks and said second regeneration chemical manifold comprises a regeneration chemical supply manifold for delivering a regeneration chemical to a treatment tank requiring regeneration.

25. A water treatment apparatus, comprising:
a) at least three treatment tanks, each tank being provided with means defining a first port and second port and containing an ion exchange media defining a fluid flow path between said first and second ports;
b) a first valve means in fluid communication with said first port of each tank and a second valve means in fluid communication with said second port of each treatment tank;
c) a source fluid manifold for delivering water to be treated to said tanks, said source manifold in fluid communication with each of said first valve means;
d) a treated fluid receiving manifold for receiving treated water from said treatment tanks, said treated fluid receiving manifold in fluid communication with each of said second valve means;
e) a regeneration chemical supply manifold for delivering a regeneration chemical to a treatment tank requiring regeneration, said regeneration supply manifold in fluid communication with each of said second valve means;
f) a regeneration chemical discharge manifold for receiving regeneration related fluids from said tanks, said regeneration discharge manifold in fluid communication with each of said first valve means;
g) said first valve means of each tank operative to selectively communicate either said source manifold or said regeneration chemical discharge manifold with said first port of its associated tank;
h) said second valve means of each tank operative to selectively communicate either said treated fluid receiving manifold or said regeneration chemical supply manifold with its associated second port;
i) regeneration control means for controlling a regeneration cycle for an exhausted tank including means for monitoring the exhaustion level for each of said of tanks and operative to initiate regeneration upon determining that a tank has reached a predetermined exhaustion level or upon determining that a second tank will reach said predetermined exhaustion level unless said first tank is regenerated immediately.

26. A water treatment apparatus, comprising:
a) at least three treatment tanks, each tank being provided with means defining a first port and second port and containing an ion exchange media defining a fluid flow path between said first and second ports;
b) a first multi-way valve in fluid communication with said first port of each tank and a second multi-way valve in fluid communication with said second port of each treatment tank;
c) a source fluid manifold for delivering water to be treated to said tanks, said source manifold in concurrent fluid communication with all of said first multi-way valves;
d) a treated fluid receiving manifold for receiving treated water from said treatment tanks, said fluid receiving manifold in concurrent fluid communication with all of said second multi-way valves;
e) a first regeneration chemical manifold in concurrent fluid communication with all of said first multi-way valves;
f) a second regeneration chemical manifold in concurrent fluid communication with all of said second multi-way valves;
g) said first multi-way valve of each tank operative to selectively communicate either said source manifold or said first regeneration chemical manifold with said first port of its associated tank;
h) said second multi-way valve of each tank operative to selectively communicate either said treated fluid receiving manifold or said second regeneration chemical supply manifold with its associated second port;
i) regeneration control means for controlling a regeneration cycle for an exhausted tank including means for monitoring the exhaustion level for each of said of tanks and operative to initiate regeneration upon determining that a tank has reached a predetermined exhaustion level or upon determining that a second tank will reach said predetermined exhaustion level unless said first tank is regenerated immediately.

* * * * *